United States Patent
Berggren et al.

(10) Patent No.: US 6,882,690 B1
(45) Date of Patent: Apr. 19, 2005

(54) SOFT TRELLIS SLICER FOR IMPROVING THE PERFORMANCE OF A DECISION-DIRECTED PHASE TRACKER

(75) Inventors: Magnus H. Berggren, San Diego, CA (US); Pranesh Sinha, San Diego, CA (US); Itzhak Florentin, M.P. Misgav (IL)

(73) Assignee: Conexant Systems, Inc., Newport Beach, CA (US)

( * ) Notice: Subject to any disclaimer, the term of this patent is extended or adjusted under 35 U.S.C. 154(b) by 881 days.

(21) Appl. No.: 09/668,231

(22) Filed: Sep. 22, 2000

(51) Int. Cl.[7] ............................................. H04L 5/12
(52) U.S. Cl. ................................................... 375/265
(58) Field of Search ............................. 348/607, 608; 375/265, 262, 341, 233, 240.1

(56) References Cited

PUBLICATIONS

*VSB Modem Subsystem Design fro Grand Alliance Digital TV Receivers*, Wayne Bretl et al., IEEE Transactions on Consumer Electronics, Aug. 1995, V. 41, No. 3, pp. 773–786.
*A Hardware Efficient Phase/gain Tracking Loop for the Grand Alliance VSB HDTV Receiver*, Wonho Lee et al., IEEE Transactions on Consumer Electronics, Aug. 1996, V. 42, No. 3, pp. 632–639.
*Design and Implementation of a Grand Alliance HDTV Receiver Prototype*, Kwonhue Choi et al., ., IEEE Transactions on Consumer Electronics, Aug. 1997, V. 43, No. 3, pp. 755–759.

*VSB Demodulator for ASIC Design and Development for HDTV System*, Myeong–Hwan Lee et al., 10th IEEE International ASIC Conference, 1997, pp. 233–237.
*The Viterbi Algorithm*, M.S. Ryan and G.R. Nudd, Department of Computer Science, University of Warwick, Coventry, England, Feb. 12, 1993, pp. 1–17.
*What Exactly is 8–VSB Anyway?*, David Sparano, <http://www.broadcast.harris.com/customer-service/8-vsb.html>, downloaded Oct. 14, 1999, pp. 1–12.

*Primary Examiner*—Don N. Vo
(74) *Attorney, Agent, or Firm*—Christopher J. Rourk; Godwin Gruber LLP

(57) ABSTRACT

A soft trellis slicer is provided in a high definition television (HDTV) receiver. The soft trellis slicer calculates a decision value and a confidence value corresponding to a phase angle error of a signal processed by the receiver. The receiver includes an equalizer, a phase tracking loop and a trellis decoder. The equalizer provides an equalized signal to the phase tracking loop; and the phase tracking loop calculates a phase angle error for the equalized signal. The trellis decoder calculates a decision value and a confidence value. The trellis decoder provides the decision value and the confidence value to the phase tracking loop, which calculates the reliability of the phase angle error based upon the phase angle error and the decision value and the confidence value provided by the trellis decoder. The trellis decoder calculates the decision value based upon a best path metric and calculates the confidence value based upon the best path metric and a second best path metric.

20 Claims, 6 Drawing Sheets

SOFT TRELLIS SLICER FOR IMPROVING THE PERFORMANCE OF A DECISION-DIRECTED PHASE TRACKER

BACKGROUND OF THE INVENTION

1. Technical Field

The present invention relates generally to a trellis-based slicer, and, more specifically, to a soft trellis slicer that improves the performance of a decision-directed phase tracker in a high definition television receiver.

2. Description of Related Art

Since the invention of television in the 1920's the resolution of a television picture has been limited by the encoding standard for the television signal. With advances in broadcasting, signal processing and television equipment, these standards have become increasingly obsolete. In the 1990's, the United States Federal Communication Commission ("FCC") announced that a slice of the frequency spectrum would be allocated for high definition television ("HDTV"). HDTV signals provide a clearer picture and higher resolution than that of the current analog NTSC ("National Television Standards Committee") or PAL (used primarily in Europe) television signals.

A number of television hardware, broadcast and computer companies in the United States began to negotiate the establishment of new standards for the broadcasting HDTV. These companies, known as the Grand Alliance, understood that encoding standards and radio frequency ("RF") modulation standards would have to be developed and agreed to before HDTV could become commercially viable. The Grand Alliance companies knew that competing standards might divide both the television and the broadcasting markets, as competing standards had split the market during the development of the video cassette recorder ("VCR"), that is, with the simultaneous development of the Betamax and VHS Systems.

In 1994, the Grand Alliance adopted and, in 1995, the FCC agreed to ("Moving Picture Experts Group") MPEG II encoding system and a Vestigial Sideband ("VSB") system for the transmission of HDTV signals. The signal protocol adopted was proposed by the Advanced Television Systems Committee ("ATSC"). Within the new standard, two transmission modes were established, a "terrestrial" mode for broadcast transmission and a "cable" mode for non-broadcast transmission. The terrestrial mode employs an 8-level modulation scheme known as 8VSB, and the cable mode employs a similar 16-level modulation scheme termed 16VSB. The 16VSB scheme can be used in non-broadcast transmission because a higher signal-to-noise ratio exists in non-broadcast transmission than is found in broadcast transmission. The use of 16VSB enables a non-broadcast transmitter to send two channels in the 6 MHz bandwidth allocated for each transmitter by the FCC, as opposed to one channel in the 8VSB terrestrial mode.

There were several technical hurdles that needed to be overcome before HDTV could be made publicly available. Perhaps one of the most significant hurdles was that new equipment, such as transmitters and receivers, had to be designed to generate and process these new types of signals. Over the last several years, a number of standard designs have been proposed to handle ATSC signals. While some basic technical questions have been resolved, other specific problems remain.

Many other problems and disadvantages of the prior art will become apparent to one skilled in the art after comparing such prior art with the present invention as described herein.

BRIEF SUMMARY OF THE INVENTION

A soft trellis slicer is provided in a high definition television ("HDTV") receiver. The soft trellis slicer calculates an difference value and for a phase angle error of a signal processed by the receiver and a confidence value for the difference value. An 8-level vestigial sideband ("8VSB") HDTV receiver includes an equalizer, a phase tracking loop and a trellis decoder. The equalizer provides an equalized signal to the phase tracking loop, which calculates a phase angle error corresponding to the equalized signal. The phase angle error is calculated by the phase tracking loop, which includes in its calculation a trellis decision signal and a trellis confidence signal provided by the trellis decoder. The trellis decoder calculates the value of the decision signal based upon a best path metric and the value of the confidence signal based upon the difference between the best path metric and a second best path metric.

The phase tracking loop then uses a decision directed ("DD") technique to determine, based upon the trellis decision signal and the trellis confidence signal, whether to use, modify and use, or disregard the phase angle error to modify the equalized signal. The soft trellis slicer confidence value is a better indicator of phase angle reliability than the output of a hard slicer that may be part of the phase tracking loop. This is especially true when the HDTV receiver employs a comb filter, which may add up to 3 dB to a signal. The soft trellis slicer provides, with a low complexity, stable and rapid phase noise tracking in the phase tracking loop despite a high noise signal.

DETAILED DESCRIPTION OF THE FIGURES

Figure 1:
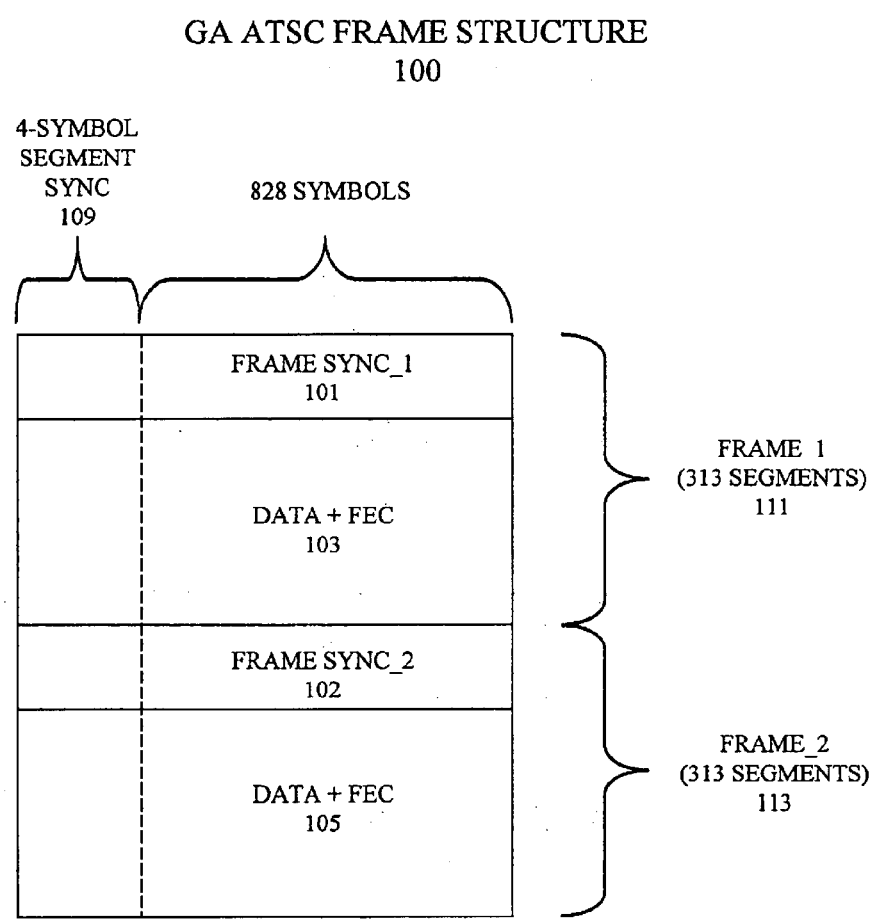
FIG. 1 is a schematic block diagram of a standard data frame structure of an Advanced Television Systems Committee ("ATSC") vestigial sideband ("VSB") signal.

FIG. 1 is a schematic block diagram of a standard data frame structure of an Advanced Television Systems Committee ("ATSC"), a public standards organization with offices in Washington, D.C., vestigial sideband ("VSB") signal. Specifically, a standard frame structure 100, includes a Frame_1 111 and a Frame_2 113, of an ATSC VSB signal as specified in the standard published by the Grand Alliance ("GA"), a consortium of television hardware manufacturers. The GA ATSC VSB standard has two modes: an 8-level "terrestrial" mode ("8VSB") and a 16-level "cable" mode ("16VSB"). In the 8VSB mode a "symbol" represents one of eight different values (±1, ±3, ±5 and ±7); and, in the 16VSB mode, a symbol represents one of sixteen different values (±1, ±3, ±5, ±7, ±9, ±11, ±13 and ±15).

A "segment" includes 832 "symbols" comprising a block of 828 symbols and a four-symbol segment synchronization module 109. Data frames Frame_1 111 and Frame_2 113 each include 313 segments. Frame_1 111 and Frame_2 113 each include a Frame Sync_1 101 and a Frame Sync_2 102, respectively, which each occupy the first segment in each of the data frames Frame_1 111 and Frame_2 113. Frame Sync_1 101 and Frame Sync_2 102 are both fixed repetitive patterns of bits that a receiver can locate in a data stream in order to find the beginning of Frame_1 111 or Frame_2 113. The first four symbols of each segment is a segment sync, that is, another fixed repetitive pattern of bits, typically +5, −5, −5 and +5. In addition, each Frame_1 111 and Frame_2 113 each include interleaved data+forward-error-correction ("FEC") portions, namely Data+FEC_1 103 and Data+FEC_2 105, respectively, which each contain 312 segments.

Figure 2:
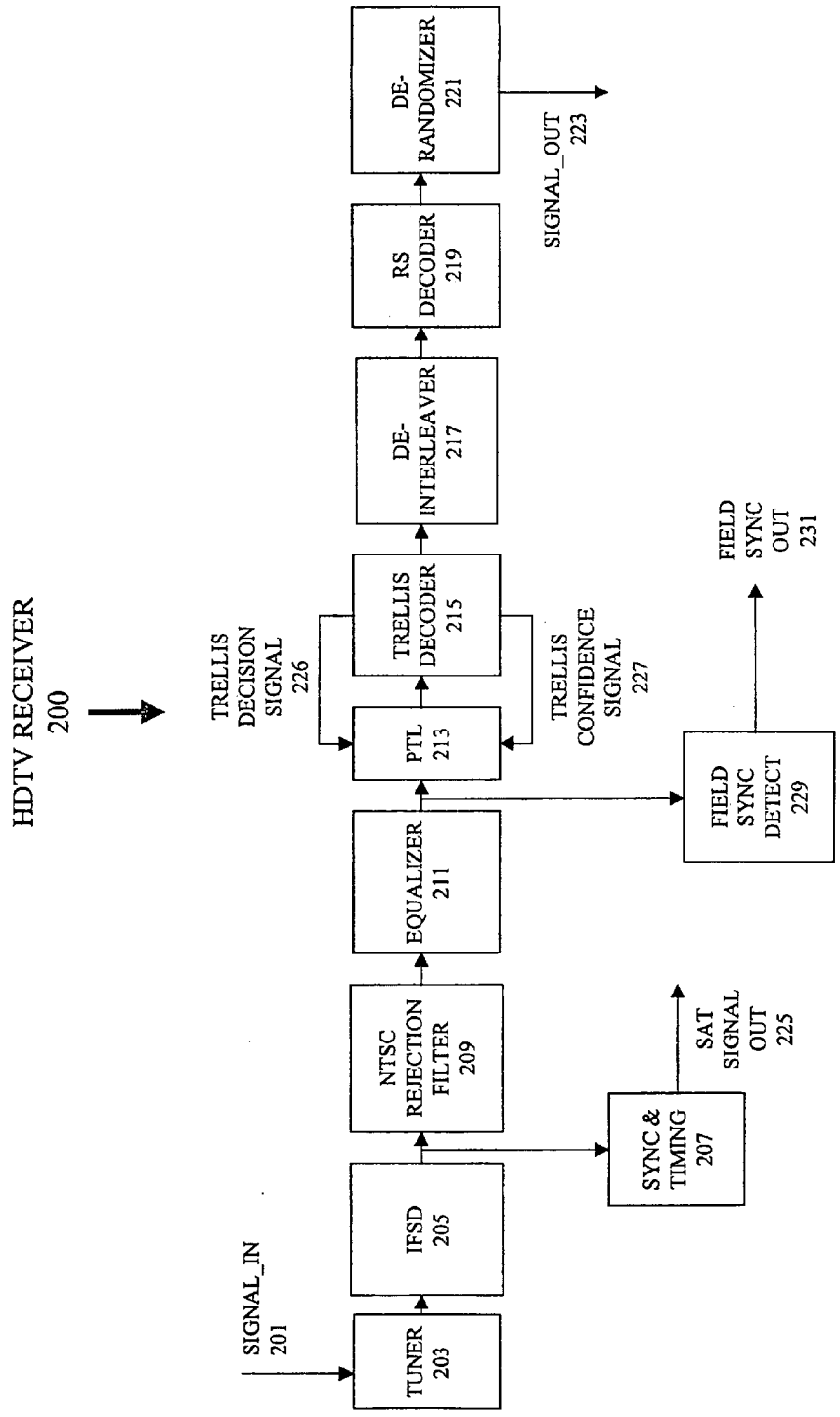
FIG. 2 is a block diagram of a high definition television ("HDTV") receiver that implements the techniques of a disclosed embodiment of the present invention.

FIG. 2 is a block diagram of a high definition television ("HDTV") receiver 200 that implements the techniques of a disclosed embodiment of the present invention. A receiver is configured to process an 8VSB signal SIGNAL_IN 201. In the disclosed embodiment, the SIGNAL_IN 201 meets the HDTV signal standard defined by the ATSC. The receiver includes a tuner 203, an IF filter and synchronization detection module ("IFSD") 205, a synchronization and timing module ("SAT") 207, a National Television Standards Committee ("NTSC"), a multinational standards organization that defined standards for television signals in 1953, rejection filter 209, an equalizer 211, a phase tracker loop ("PTL") 213, a trellis decoder 215, a de-interleaver 217, a Reed-Solomon ("RS") decoder 219 and a de-randomizer 221.

The tuner 203 enables a user to select a specific frequency in the UHF or VHF frequency band of the received signal SIGNAL_IN 201 and shift it to a more desirable low frequency signal that the tuner 203 passes to the IFSD 205. The incoming signal SIGNAL_IN 201 is described as such throughout the description of this embodiment with the understanding that SIGNAL_IN 201 is modified from component to component. The tuner 203 includes a plurality of oscillators that generate appropriate sinusoids to translate the specific frequency of an RF signal to a more desirable low frequency signal. During frequency translation, one or more oscillators typically introduce "phase noise" that degrades the incoming signal. That is, the oscillators do not produce pure sinusoids, but instead produce "smeared" sinusoids due to instabilities in the local oscillator. This smearing makes the incoming signal more difficult to process because the levels of the 8VSB signal may be moved closer to decision boundaries, particularly in the presence of noise. Uncompensated phase noise can lead to long bursts of errors in the processing of the incoming signal, which substantially degrades the performance of the HDTV receiver.

In this embodiment of the invention, the IFSD 205 and the SAT 207 further filter the incoming signal SIGNAL_IN 201 and locate the beginning of frame and segment boundaries. Each symbol of a data frame such as Frame_1 111 includes a pilot signal. The pilot signal is a small DC shift in the 8VSB signal that allows the HDTV receiver 200 to lock onto SIGNAL_IN 201 in a manner that is independent of the data being transmitted. Once a pilot signal has been recognized, the receiver 200 looks for repetitions, 828 symbols apart, of the segment sync, which consists of the four-symbol pattern +5, −5, −5 and +5, as described above with reference to FIG. 1. The receiver 200 searches for repetitions of this four-symbol pattern before locking on to SIGNAL_IN 201 because, for example, Data+FEC_1 103 may also occasionally contain the same four-symbol pattern. Finally, the receiver 200 looks for a field sync pattern, repeated every 313 segments, synchronous to the frames.

After the IFSD 205 and the SAT 207 have completed filtering, locating and synchronizing with the data frames of SIGNAL_IN 201, the NTSC filter 209 detects and reduces co-channel interference if present. In the disclosed embodiment, the NTSC filter 209 is implemented by means of a 12-symbol comb filter that translates the 8VSB incoming signal 201 into a 15-level signal. The NTSC filter 209 can be switched in or out depending on the presence or absence of co-channel NTSC interference. This switching does not interrupt reception and therefore can be performed "real-time" as signal conditions require. The switching of the NTSC filter 209 has a finite response time of twelve symbols, the significance of which will be clearer following the description of the trellis decoder 215 below. When the NTSC filter 209 is switched in, SIGNAL_IN 201 gains approximately 3 dB of noise and the techniques of the disclosed embodiment become particularly helpful in decoding the incoming SIGNAL_IN 201. SIGNAL_IN 201 is first processed by the NTSC filter 209 then processed by the equalizer 211.

The equalizer 211 compensates for linear channel distortions such as tilting and "ghosting." Linear distortions can originate from the transmission channel or from imperfect components within the receiver 200. The equalizer employs one of three methods: a frame sync method, a frame data method or a blind method. The method employed depends upon the condition of the SIGNAL_IN 201. The receiver 200 can switch between the modes as signal conditions change.

Using the frame sync method, the equalizer 211 searches for the fixed repetitive pattern in SIGNAL_IN 201 that represents the Frame Sync_1 101 and Frame Sync_2 102 (FIG. 1). Once the repetitive frame sync pattern is found, the equalizer 211 can determine a very good error value by performing a least-mean-square ("LMS") fit between an observed data pattern of SIGNAL_IN 201 and the fixed repetitive data pattern of Frame Sync_1 101 and Frame Sync_2 102. However, the frame sync method may not be sufficient to track dynamic "ghosts" in SIGNAL_IN 201 because such tracking would require tap adjustments more often than Frame Sync_1 101 and Frame Sync_2 102 are transmitted.

After performing a data sync adjustment, the equalizer 211 may switch to the frame data method. Using 8VSB, for example, the frame data method depends upon the fact that at a specific point within a sampling time frame SIGNAL_IN 201 should be at one of eight discrete levels. Wave traces typically show a "seven-eye" pattern in which each eye represents a lack of signal between the eight expected values. The equalizer 211 puts SIGNAL_IN 201 through an eight-level hard "slicer" that partitions SIGNAL_IN 201 into eight partitions and then compares partitions with the expected "seven-eye" pattern. Again, a fit can be calculated between the observed, sliced SIGNAL_IN 201 and the expected signal; and the error value can be used to adjust SIGNAL_IN 201 before this signal is output from the equalizer 211.

Finally, the blind method of data synchronization can be employed by the equalizer 211 for fast initial signal acquisition or when SIGNAL_IN 201 has degraded to the point where the "seven-eye" pattern is no longer present. The blind method models SIGNAL_IN 201 as a binary signal and produces an error estimate, or calculation, by detecting the sign of SIGNAL_IN 201 and subtracting a scaled binary signal from the output.

After SIGNAL_IN 201 has been processed by the equalizer 211, it is processed by the phase tracker loop or PTL 213. The PTL 213 further compensates for phase error in SIGNAL_IN 201. Because SIGNAL_IN 201 has already been synchronized with the receiver 200 by the synchronization and timing module or SAT 207 and equalized by the equalizer 211, the PTL 213 can use more efficient methods to calculate and detect phase error that may remain in SIGNAL_IN 201. The PTL 213 employs a "decision-directed" ("DD") technique to determine how to correct for a detected phase error Φ. The DD technique controls a phase angle error correction mechanism based upon a reliability metric.

After the PTL 213 has processed SIGNAL_IN 201, the signal is processed by the trellis decoder 215. The trellis decoder 215 in the receiver 200 processes SIGNAL_IN 201, reversing the typical operation of a trellis encoder within an HDTV transmitter. Generally, the trellis encoder in an HDTV transmitter breaks each 8-bit byte of a signal to be transmitted into four 2-bit symbols. Each symbol is compared with the immediately preceding symbol and, based upon this comparison, a 3-bit symbol is produced. For every two bits that go into the trellis encoder, three bits emerge and, accordingly, the typical trellis encoder in an HDTV transmitter is known as a "2/3" trellis encoder. In addition to decoding the trellis encoding of SIGNAL_IN 201, the trellis decoder 215 produces a trellis decision signal 226 and a trellis confidence signal 227 that are used by the PTL 213 to make a determination of whether a specific phase error correction is reliable or not. The trellis decision signal 226 and the trellis confidence signal 227 are employed in the DD techniques of the PTL 213.

After being processed by the trellis decoder 215, SIGNAL_IN 201 proceeds to the de-interleaver 217. The de-interleaver 217 reverses an interleaving process that is performed on a signal to be transmitted by an HDTV transmitter. By utilizing memory buffers, the HDTV transmitter scrambles the order of the transmitted signal by rearranging the order of symbols within the transmitted signal. Interleaving thus minimizes the transmitted signal's susceptibility to "burst-type" interference. That is, it is less likely that burst-type interference will affect sequential symbols in a transmitted signal if the sequential symbols are separated from each other by other symbols when transmitted. The function of the de-interleaver 217 is to re-arrange the sequential symbols of SIGNAL_IN 201 into their proper order.

Following output from the de-interleaver 217, SIGNAL_IN 201 is introduced to the "Reed-Solomon" or RS decoder 219. The RS decoder 219 corrects for byte errors in the SIGNAL_IN 201. Both RS encoding and trellis encoding are forward-error-correction ("FEC") techniques that are applied by the transmitter to SIGNAL_IN to be transmitted. In the 8VSB standard, the signal to be transmitted is partitioned into data frames equal to 187-byte blocks. For each 187-byte block, the RS encoder calculates a twenty byte "check sum," which is then appended to the end of the corresponding block. This check sum is used by the RS decoder 219 to detect, locate and correct errors in the now 207-byte (i.e., 187+20) blocks of the signal 201. The RS decoder 219 can correct error rates as great as ten bytes per block. Although error rates greater than ten bytes per block are detected by the RS decoder 219, in that instance, the RS decoder 219 can no longer verify the accuracy of the block and, accordingly, the block is typically discarded.

SIGNAL_IN 201 is then processed by the de-randomizer 221. The de-randomizer 221 reverses the customary randomizing performed by a randomizer within an HDTV transmitter. A signal is randomized in order to provide the signal with a flat noise-like spectrum so that the bandwidth allocated for the signal is used to maximum efficiency. A typical ATSC signal is likely to contain repetitious patterns that would "lump" the energy content of an RF signal into certain points in the frequency spectrum. Lumping in one portion of the spectrum would decrease energy content in other portions of the spectrum, thereby overutilizing the lumped portions of the spectrum, underutilizing the sparse portions of the spectrum and leading to a general inefficiency in transmission. Additionally, a large concentration of energy at certain modulating frequencies can cause "beat" patterns in a typical NTSC television set. To alleviate this problem, the randomizer changes each byte value in the signal to be transmitted according to a known pattern of pseudo-random numbers. The de-randomizer 221 reverses the randomization to recover the original transmitted signal.

After SIGNAL_IN 201 is processed by de-randomizer 221 and thus has completed its path through the components of receiver 200, SIGNAL_OUT 223 emerges. SIGNAL_OUT 223 is an MPEG II encoded signal that an HDTV set can decompress and display on a screen.

Figure 3:
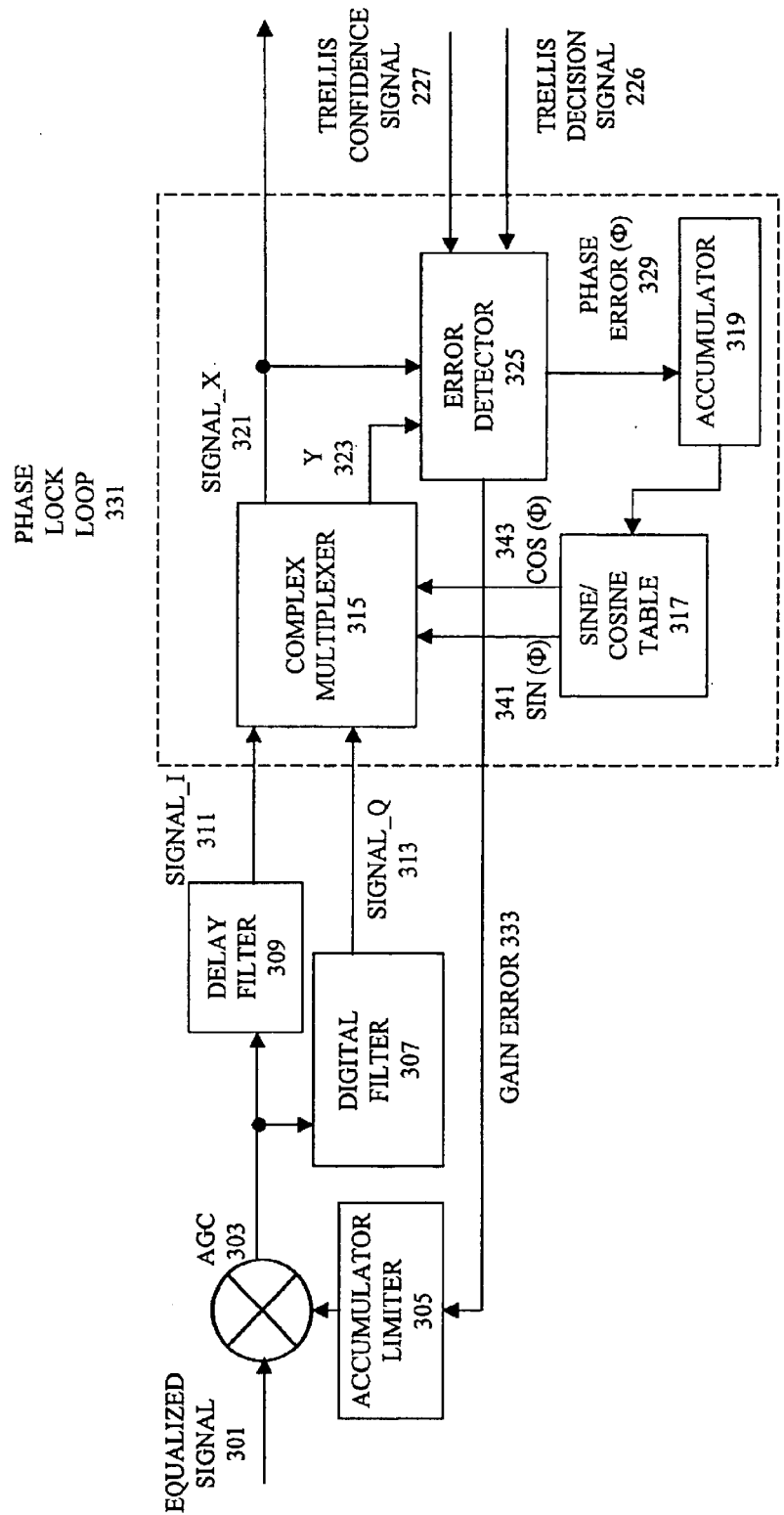
FIG. 3 is a block diagram showing a phase tracking loop with the HDTV receiver of FIG. 2.

FIG. 3 is a block diagram showing a phase tracking loop with the HDTV receiver of FIG. 2. Here the PTL 213 receives an equalized input signal 301 and produces an output signal SIGNAL_X 321. It should be understood that both the equalized signal 301 and the output signal SIGNAL_X 321 are a form of SIGNAL_IN 201 (FIG. 2), which is real. The equalized signal 301 is first introduced to an automatic gain control ("AGC") module 303 and then essentially simultaneously to both a digital filter 307 and a delay filter 309. In an alternative embodiment, the equalized signal 301 may be complex, in which case digital filter 307 and the delay filter would not be necessary. The digital filter 307 generates an approximation of a quadrature component SIGNAL_Q 313 of the equalized input signal 301. The digital filter 307 may be approximated with a finite impulse response ("FIR") filter with fixed, anti-symmetric coefficients in which every other coefficient is zero. The delay filter produces an in-phase signal SIGNAL_I 311, which is delivered, along with the SIGNAL_Q 313 signal, into a complex multiplexer 315 of a phase lock loop ("PLL") 331.

The PLL 331 includes the complex multiplexer 315, an error detector 325, an accumulator 319 and a sine/cosine lookup table 317. The complex multiplexer 315 outputs two signals: SIGNAL_X 321, and a second signal SIGNAL_Y 323 to the error detector 325. The error detector discussed above, calculates a phase angle error Φ and also determines whether the phase error should be used, modified or disregarded. The procedure of deciding whether to use, modify or disregard a calculated phase error is the decision-directed ("DD") method, discussed above. In a typical HDTV receiver, the decisions inherent in this method are performed on the basis of calculations on SIGNAL_X 321 and SIGNAL_Y 323. In this embodiment, the trellis decision signal 226 and the trellis error signal 227 (FIG. 2) are also used by the error detector 325 to perform the calculations of the DD method.

If the error detector 325 calculates a phase angle error Φ that it determines should not be disregarded, the phase angle error Φ is transmitted to the accumulator 319 and a gain error signal 333 is transmitted to an accumulator limiter 305. The accumulator 319 transmits the phase angle error Φ to a sine/cosine lookup table 317 that calculates the sine (Φ) 341 and the cosine (Φ) 343 of the phase angle error Φ and transmits these values to the complex mutiplexer 315, which uses sine (Φ) 341 and cosine (Φ) 343 to make calculations on subsequent data points. The accumulator limiter 305 sends a signal to the AGC 303, which applies a phase angle correction to SIGNAL_IN 201.

Figure 4:
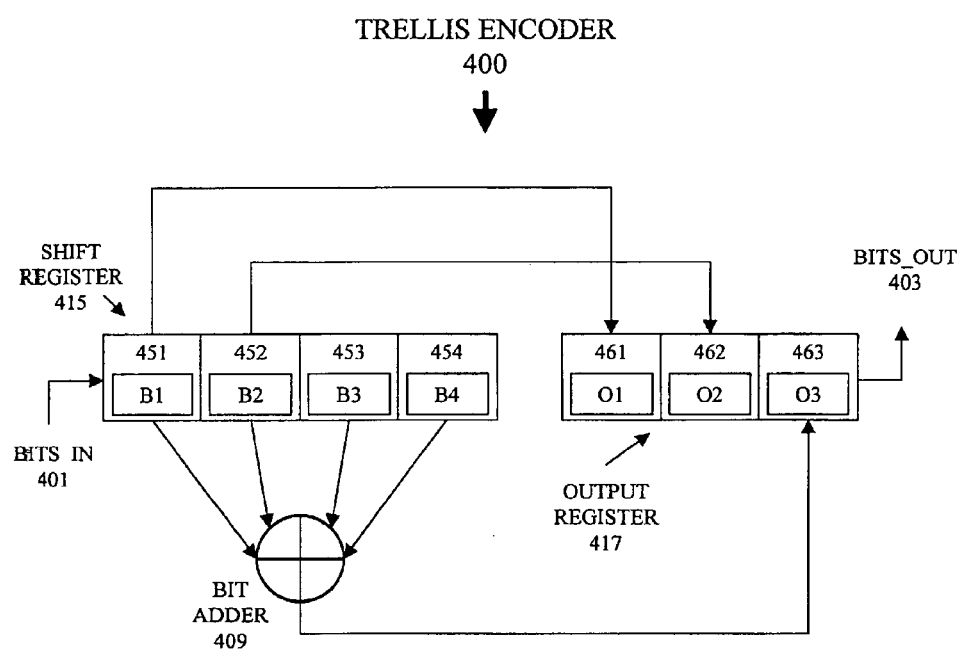
FIG. 4 is a diagram of a trellis encoder that implants the techniques of a disclosed embodiment of the present invention.

FIG. 4 is a diagram of a trellis encoder that implements the techniques of a disclosed embodiment of the present invention. A trellis encoder 400 comprises a BITS_IN signal 401 that shifts a 2-bit symbol that consists of a B1 bit and a B2 bit, into a first shift register position 451 and a second shift register position 452, respectively, of a shift register 415. When bits B1 and B2 are moved into the shift register 415, a bit B3 and a bit B4 are shifted from the first shift register position 451 and second shift register position 452 of the shift register 415 to a third shift register position 453 and a fourth shift register position 454. The trellis encoder 400 also contains an output register 417. A bit O1 in a first output register position 461 of output register 417 is set equal bit B1 in the register position 451 of the shift register 415. A bit O2 in a second output register position 462 of output register 417 is set equal bit B2 in the second shift register position 452. A bit O3 in the third output register position 463 of output register 417 is calculated with a Bit Adder_3 409 by adding all the bits, namely B1, B2, B3 and B4, in the shift register 415. Bits O1, O2 and O3 are calculated as single bit additions that disregard any carry bits that may be generated.

In effect, the trellis encoder 400 assigns a specific 3-bit pattern to each 2-bit to 2-bit transition. Because there are sixteen possible transitions from every 2-bit pattern to every 2-bit pattern and a 3-bit value has only eight possible values, each 2-bit to 2-bit transition shares a transition value with one other transition. The following table shows the value in the output register 417 for all possible 2-bit symbol values stored in first shift register position 451 and second shift register position 452 (rows) and in third shift register position 453 and fourth shift register position 454 (columns) as calculated by the trellis encoder 400:

| OUTPUT REGISTER VALUES Input Bits B1, B2 ↓ | Input Bits B3, B4 → | | | |
|---|---|---|---|---|
|  | 00 | 01 | 10 | 11 |
| 00 | 000 | 001 | 001 | 000 |
| 01 | 011 | 010 | 010 | 011 |
| 10 | 101 | 100 | 100 | 101 |
| 11 | 110 | 111 | 111 | 110 |

Bits O1, O2 and O3 in output register 417 are then transmitted out of the trellis encoder 400, and become part of a transmitted signal. Thus, each 2-bit symbol that is shifted into the shift register 415 becomes a 3-bit symbol in the output register 417. As explained above in conjunction with FIG. 2, the function of the trellis decoder 215 includes trellis decoding, that is, converting the 3-bit symbol back into a 2-bit symbol based upon the value of the 3-bit symbol and a previous, decoded 2-bit symbol. Additional information added to SIGNAL_IN 201 by the trellis encoder 400, enables the receiver 200 to perform error checking and recovery and, by using the techniques of the disclosed embodiment, to improve the DD functionality of the PTL 213.

The trellis encoder of FIG. 4 is shown to explain the concept of trellis encoding and decoding. FIG. 4 is used as only as an example of trellis encoding and decoding in general. The actual encoding/decoding technique employed in the disclosed embodiment and described in the 8VSB standard is a 12-level trellis encoding/decoding method.

Figure 5:
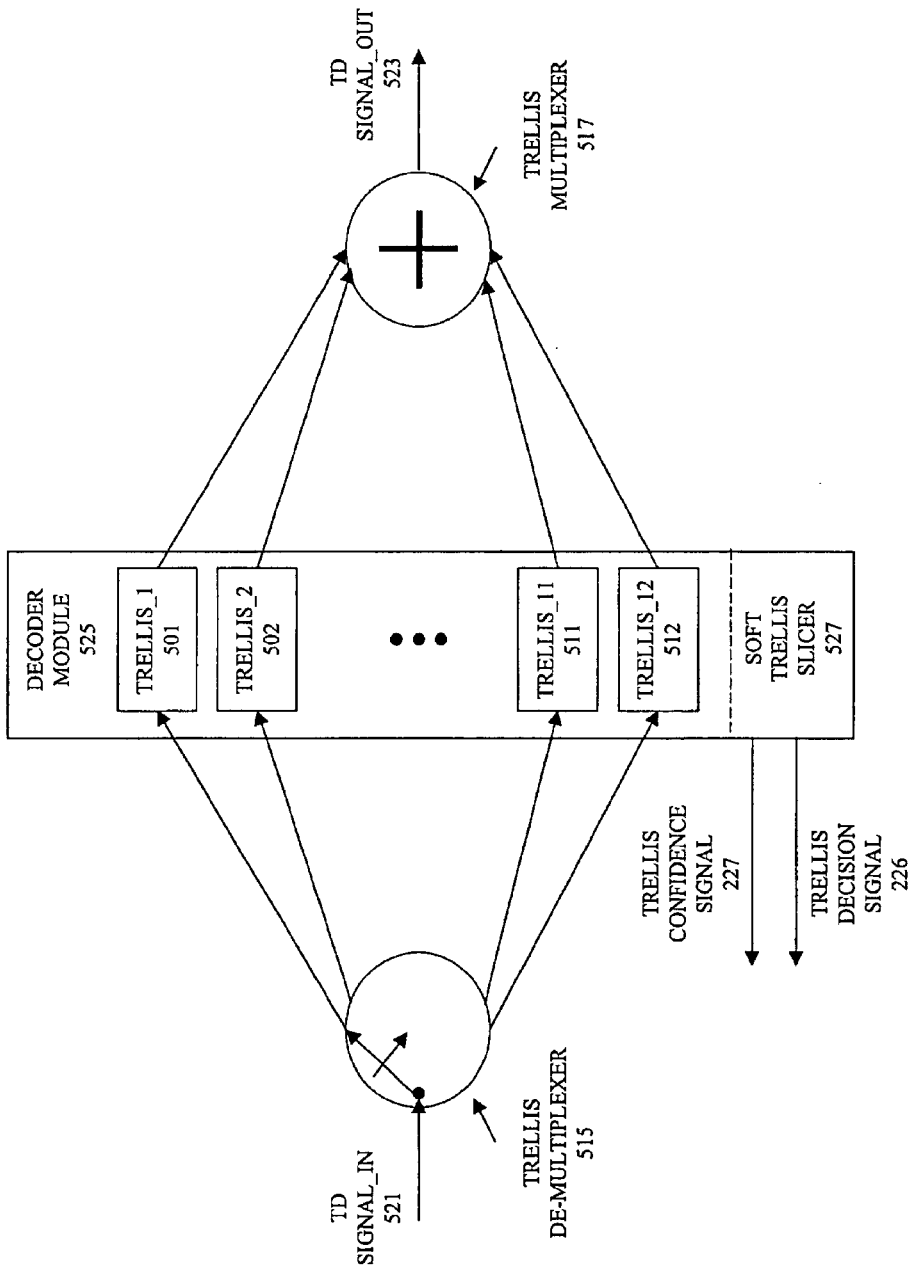
FIG. 5 is a decoding portion of an exemplary 12-level trellis decoder that implements the techniques of a disclosed embodiment of the present invention.

FIG. 5 is a decoding portion of an exemplary 12-level trellis decoder that implements the techniques of a disclosed embodiment of the present invention. A trellis decoder 500 processes a trellis decoder (TD) SIGNAL_IN 521 and produces a TD SIGNAL_OUT 523. Both the SIGNAL_IN 521 and the SIGNAL_OUT 523 are manifestations of SIGNAL_IN 201 (FIG. 2). The trellis decoder 500 processes 3-bit symbols, similar to those produced by the trellis encoder 400, to reconstruct a ATSC data stream from one 2-bit symbol to the next 2-bit symbol. The strength of trellis encoding and decoding is its ability to track the history of SIGNAL_IN 201 over time and to detect and discard errors based upon the history of the signal. Trellis encoding/decoding enables a lost symbol to be reconstructed based upon an immediately previous symbol and an immediately following symbol. The techniques of the disclosed embodiment also improve the DD processing of the PTL 213.

Initially, the SIGNAL_IN 521 is processed by a trellis de-multiplexer 515 that allocates the SIGNAL_IN 521 to one of twelve trellis "threads," namely Trellis_1 501 through Trellis_12 512. The trellis threads 501 through 512 are individually trellis decoded by a decoding module 525. This 12-level scheme prevents burst errors from interfering with the advantages provided by trellis encoding/decoding. Since each individual trellis thread 501 through 512 represents a single trellis data stream, a burst error has to exceed twelve symbols in order for more than one successive symbol in a stream to be lost and not recoverable. That is, as long as not more than one successive symbol is lost in a twelve trellis thread the lost symbol can be reconstructed based upon symbols that are immediately preceding and following the lost symbol. Following decoding by the decoder module 525, the now decoded trellis threads, Trellis_1 502, Trellis_2 502 through Trellis_12 512 are multiplexed by a trellis multiplexer 517 into the trellis TD SIGNAL_OUT 523.

The decoder module 525 includes a soft trellis slicer 527 that monitors each trellis thread Trellis_1 501 through Trellis_12 512 and produces the trellis error signal 227. In the event that a comb filter is used in the PTL 213, the soft trellis slicer 527 produces an 8-level slice. If the PTL 213 does not use a comb filter, the soft trellis slicer 527 produces a 4-level slice. The trellis error signal 227 is provided to the PTL 213 (FIG. 2), which uses it to augment the DD functionality of the PTL 213. The soft trellis slicer 527 calculates the value of the trellis confidence signal 227 by means of "path metrics," described in more detail below in conjunction with FIG. 6.

Figure 6:
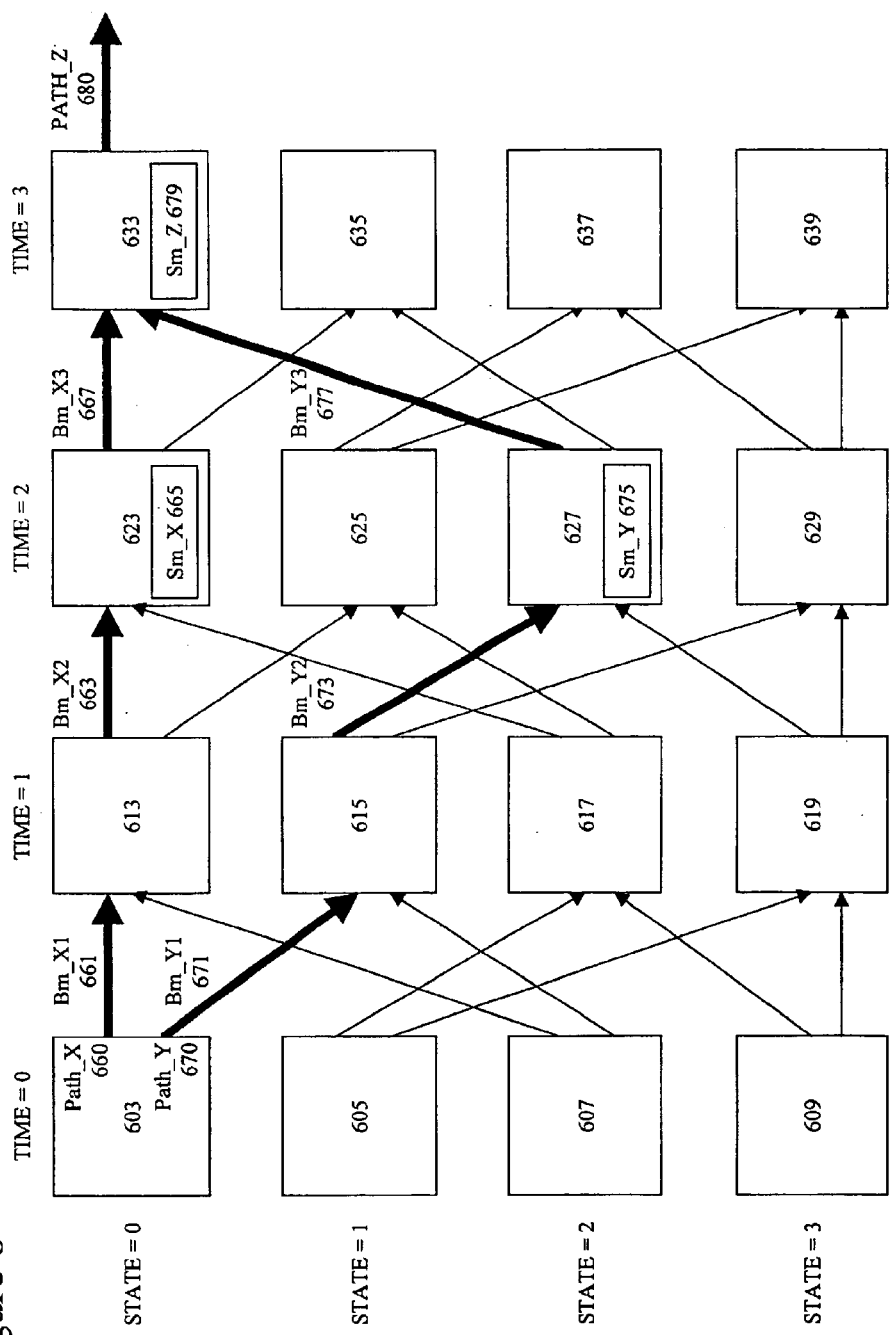
FIG. 6 is a block diagram illustrating exemplary state transitions and path metrics within a trellis decoder.

FIG. 6 is a block diagram illustrating exemplary state transitions and path metrics within a 4-state trellis decoder of the disclosed embodiment. Although the disclosed embodiment employs a 15-state trellis decoder 215, FIG. 6 is based upon a 4-state trellis decoder for simplicity. The columns represent states of the 4-state trellis decoder at successive intervals of time=0 (represented by a box 603, a box 605, a box 607 and a box 609), time=1 (represented by a box 613, a box 615, a box 617 and a box 619), time=2 (represented by a box 623, a box 625, a box 627 and a box 629) and time=3 (represented by a box 633, a box 635, a box 637 and a box 639), each interval equal to a period of time necessary to transmit one bit of information. The rows represent the four possible states of the 4-state trellis decoder. In this example in state 0 (represented by box 603, box 613, box 623 and box 633), the bits of the trellis decoder are equal the value of "00," in state 1 (represented by box 605, box 615, box 625 and box 635), the bits are equal "01," in state 2 (represented by box 607, box 617, box 627 and box 637), the bits are "10," and, in state 3 (represented by box 609, box 619, box 629 and box 639), the bits are equal "11." For example, box 603 represents the 4-state trellis decoder at time=0 with a state equal "00." If a bit equal '0' is shifted into the 4-state trellis decoder in the interval of time between time=0 and time=1, then the state of the decoder at time=1 is equal "00," represented by box 613. If a bit equal '1' is shifted into the 4-state trellis decoder in the interval of time between time=0 and time=1, then the state of the decoder at time=1 is equal "01," represented by box 615. A Path_X 660 and a Path_Y 670 represent two possible paths between box 603 and box 633: Path_X 660 by way of box 613 and 623 and Path_Y 670 by way of box 615 and 627. Path_X 660 is the path followed if the bits received in the intervals between time=0 and time=1, time=1 and time=2 and time=2 and time=3 all equal '0'. Path_Y 670 is followed if the bits between time=0 and time=1, time=1 and time=2 and time=2 and time=3 are '1', '0', and '0' respectively.

The transitions of both Path_X 660 and Path_Y 670 from time=0 to time=1 are associated with path metrics, Bm_X1 661 and Bm_Y1 671 respectively. The path metrics 661 and 671 represent values for the probability of a particular value for the incoming bit For example, if an incoming signal that is phase shifted 0 degrees represents the digital value '0', and an incoming signal that is phase shifted 180 degrees represents the digital value of '1', and the incoming signal is phase shifted exactly 0 degrees, then the branch metric Bm_X1 661 is equal to '0' and the branch metric Bm_Y1 671 is equal to some positive value. If however the incoming signal is phase shifted 80 degrees, then the value of the corresponding digital signal is ambiguous and the path metrics Bm_X1 661 is set to a positive value and the path metric Bm_Y1 671 is set to a higher positive value. In this case, the Bm_X1 661 would be set to a lower value than Bm_Y1 671 because there is a greater probability that the 80 degree phase shift represents a '0' (0 degrees) than a '1' (180 degrees).

The values of branch metrics are calculated between each time interval and at each state a branch sum metric is calculated. In this example, a branch metric sum Sm_X 665 for box 623 in time interval=2 is calculated in conjunction with Path_X 660 by adding branch metric Bm_X1 661 and a branch metric Bm_X2 663. In a similar fashion, a branch metric sum Sm_Y 675 for box 627 is calculated in conjunction with Path_Y 670 by adding together Bm_Y1 671 and a branch metric Bm_Y2 672.

A path Path_Z 680 is a continuation of either Path_X 660 or Path_Y 670. A path metric sum Sm_Z 679 represents a sum of branch metrics along the path 660 or 670 with the most likely path being the path with the lowest path metric sum. In other words, Sm_Z 679 is set equal the lower of the sum of Sm_X 665 plus a branch metric Bm_X3 667 or the sum of Sm_Y 675 plus a branch metric Bm_Y3 677. The most likely path between box 603 and box 633 corresponds to the path 660 or 670 with the lowest sum of branch metrics.

It should be noted that because of the accumulating nature of the branch metric sums, the sums typically need to be normalized occasionally. One method of normalization is to subtract an equal amount periodically from each sum. In an environment with high signal-to-noise ratios, normalization is typically required more frequently than in an environment with low signal-to-noise ratios.

In the disclosed embodiment, the soft trellis slicer 527 examines each possible path that can lead to a particular sequence of 3-bit symbols and calculates a probability that a particular path is the "correct" path based upon the path metric sums. If the first and second most likely paths have a large difference in path metric sums, then the trellis confidence signal 227 has a high value. On the other hand, if the first and second most likely paths both have a small difference in probability then the trellis confidence signal 227 has a low value. If the difference, or the confidence signal 227, is high; then the PTL 213 can have a relatively high confidence in the trellis decision signal 226. On the other hand, if the first path metric sum and the second path metric sum correspond to paths that are approximately equal, then a difference between the first path metric and the second path metric is low, the trellis confidence signal is low and the PTL 213 may decide to disregard the trellis decision signal 226. In other words, the magnitude of the trellis confidence signal 227 determines how much "weight" the PTL 213 places on the trellis decision signal 226 in its DD method. If the confidence value or the decision value exceed specified threshold values, they can be scaled back to predetermined decision and confidence values.

There are a number of algorithms that can calculate this type of "path metric," for example, the Viterbi algorithm, which is well known to those with skill in the art. The techniques of the disclosed embodiment calculate the path metrics based upon a trace-back length of one. Using a trace-back length of one prevents a delay in the decoding that might destabilize the loop formed between the trellis decoder 215 and the PTL 213. In addition, the techniques of the disclosed embodiment is not restricted to a PTL device but can be employed by equalizers or any other device that can benefit from a decision feedback signal.

We claim:

1. A method of making a phase angle correction in a phase tracking loop, comprising the steps of:

calculating a phase angle error in a signal;

calculating a decision value based upon a first path metric of a plurality of path metrics corresponding to a plurality of paths through a trellis decoder calculating a confidence value based upon the first path metric and a second path metric of the plurality of path metrics;

adjusting the phase angle error based upon the confidence value and the decision value; and modifying the signal based upon the adjusted phase angle error.

2. The method of claim 1, wherein the phase angle is calculated by a phase lock loop.

3. The method of claim 1, wherein the signal is the output of a comb filter.

4. The method of claim 1, wherein the signal is an Advanced Television Systems Committee (ATSC) signal.

5. The method of claim 1, wherein the step of calculating the confidence value comprises the steps of:

subtracting the second path metric from the first path metric to create a distance value; and setting the confidence metric based upon the distance value.

6. The method of claim 5, wherein the first path metric is a best path metric and the second path metric is a second best path metric.

7. The method of claim 5, wherein the distance value is set to a first threshold value if the distance value is greater than a second threshold value.

8. The method of claim 1, wherein the step of calculating an confidence value is based upon a nominal trace-back length.

9. A soft trellis slicer, comprising:
- logic for calculating a plurality of path metrics of a signal based upon a plurality of possible paths of the signal through a trellis decoder;
- logic for setting a soft slicer decision value based upon a first path metric of the plurality of path metrics;
- logic for calculating a confidence value based upon a difference between the first path metric of the plurality of path metrics and a second path metric of the plurality of path metrics;
- a phase tracking loop, comprising:
  - logic for calculating a phase angle error of the signal; and
  - logic for adjusting the phase angle error based upon the soft slicer decision value and the confidence value.

10. The soft trellis slicer of claim 9, the phase tracking loop further comprising:
- a phase lock loop for calculating the phase angle error.

11. The soft trellis slicer of claim 9, wherein the signal is the output of a comb filter.

12. The soft trellis slicer of claim 9, wherein the signal is an Advanced Television Systems Committee (ATSC) signal.

13. The soft trellis slicer of claim 9, wherein the confidence value is set to a first threshold value if the confidence value is greater than a second threshold value.

14. The soft trellis slicer of claim 9, wherein the first path metric is a best path metric and the second path metric is a second best path metric.

15. The soft trellis slicer of claim 9, wherein the logic for calculating the plurality of path metrics depends upon a nominal trace-back length.

16. A high definition television (HDTV) receiver, comprising:
- a trellis decoder, the trellis decoder comprising:
  - a soft trellis slicer, comprising:
    - logic for calculating a plurality of path metrics of a signal based upon a plurality of possible paths of the signal through a trellis decoder;
    - logic for calculating a confidence value based upon a difference between a first path metric of the plurality of path metrics and a second path metric of the plurality of path metrics;
    - logic for setting a soft slicer decision value based upon the first path metric; and
  - a phase tracking loop, comprising:
    - logic for calculating a phase angle error of the signal; and
    - logic for adjusting the phase angle error based upon the soft slicer decision value and the confidence value.

17. The HDTV receiver of claim 16, the phase tracking loop further comprising:
- a phase lock loop for calculating the phase angle error.

18. The HDTV receiver of claim 16, wherein the signal is the output of a comb filter.

19. The HDTV receiver of claim 16, wherein the confidence value is set to a threshold value if the confidence value is greater than the threshold value.

20. The HDTV receiver of claim 16, wherein the logic for calculating the plurality of path metrics depends upon a nominal trace-back length.

* * * * *